No. 643,293. Patented Feb. 13, 1900.
E. & B. HOLMES & E. F. BEUGLER.
PLANING MACHINE.
(Application filed Sept. 29, 1897. Renewed Sept. 7, 1899.)

(No Model.)

Witnesses,

Inventors,
Edward Holmes
Britain Holmes
Edwin F. Beugler
By James Sangster, Attorney.

THE NORRIS PETERS CO., PHOTO-LITHO., WASHINGTON, D. C.

UNITED STATES PATENT OFFICE.

EDWARD HOLMES, BRITAIN HOLMES, AND EDWIN F. BEUGLER, OF BUFFALO, NEW YORK, ASSIGNORS TO THE E. & B. HOLMES MACHINERY COMPANY, OF SAME PLACE.

PLANING-MACHINE.

SPECIFICATION forming part of Letters Patent No. 643,293, dated February 13, 1900.

Application filed September 29, 1897. Renewed September 7, 1899. Serial No. 729,782. (No model.)

*To all whom it may concern:*

Be it known that we, EDWARD HOLMES, BRITAIN HOLMES, and EDWIN F. BEUGLER, citizens of the United States, residing at Buffalo, in the county of Erie and State of New York, have invented certain new and useful Improvements in Planing-Machines, of which the following is a specification.

Our invention relates to a certain new and useful means for adjusting and operating the matcher-head belts of a planing-machine and also for tightening the other operating-belts, all of which will be fully and clearly hereinafter described and claimed, reference being had to the accompanying drawings, in which—

Figure 1:
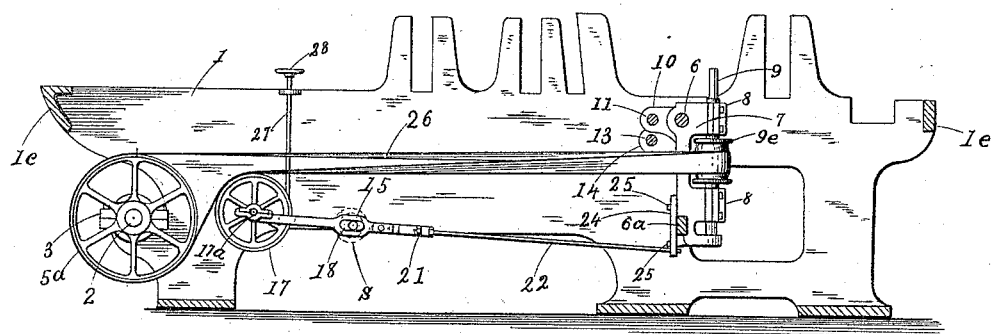
Figure 2:
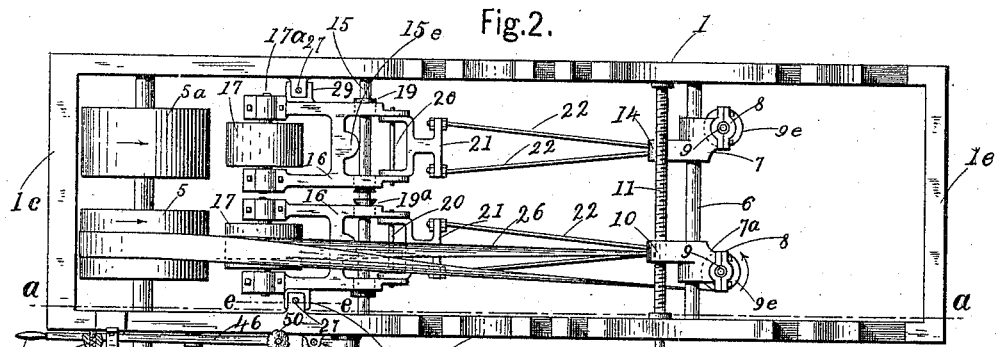
Figure 3:
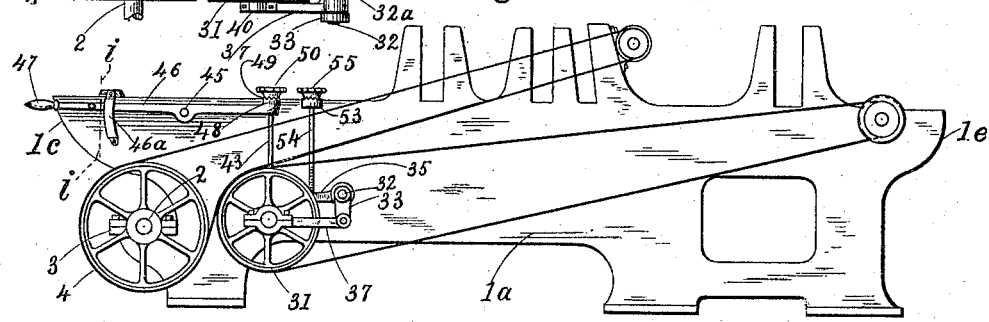
Figure 3:
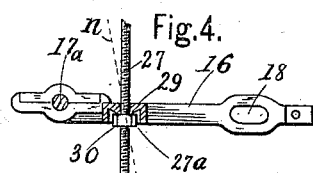
Figure 3:
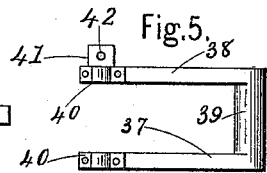
Figure 3:
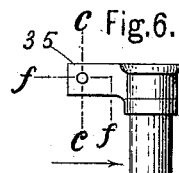
Figure 3:
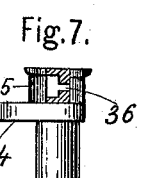
Figure 3:
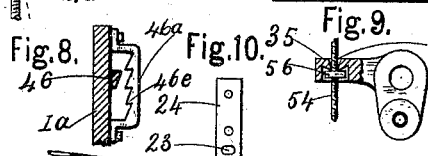
Figure 3:
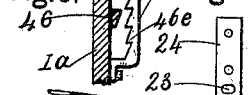

Figure 1 represents a vertical longitudinal section through a planing-machine frame on or about line $a\,a$, Fig. 2, showing a side elevation of the mechanism carrying the matcher-head belts. Fig. 2 represents a top plan view of a planing-machine frame and a similar view of the matcher-head mechanism within it, also a similar view of the belt-tightening mechanism. Fig. 3 represents a side elevation of a planing-machine frame, showing a similar view of the belt-tightening mechanism. Fig. 4 represents a section through a portion of one of the adjusting-frames on or about line $e\,e$, Fig. 2. Fig. 5 is a detached top view of the belt-tightening-pulley-supporting frame. Fig. 6 represents a detached top view of the frame in which the belt-tightening-pulley frame is pivoted. Fig. 7 is a front elevation of the frame shown in Fig 6 looking in the direction of the arrow V, showing a transverse section on or about line $c\,c$, Fig. 6. Fig. 8 represents an enlarged section through a portion of the side of the frame of the machine on or about line $i\,i$, Fig. 3, showing the holding device for the tightening-lever. Fig. 9 represents a side elevation of Fig. 6 looking in the direction of the arrow W, showing also a section on or about line $f\,f$, Fig. 6. Fig. 10 represents a front or face view of a holding-piece secured to the lower portion of each cutter-head frame.

Heretofore in running planing-machines in which the matcher-heads are made adjustable toward or from each other there has been considerable trouble in keeping the driving-belts in their proper position upon their pulleys during such adjustment of the matcher-heads.

Our invention is chiefly designed to avoid the objection above mentioned.

In referring to the drawings in detail like numerals designate like parts.

1 and $1^a$ represent the sides of the usual planing-machine frame and are preferably constructed of cast-iron, and the ends of the frame are designated by the numerals $1^c$ and $1^e$.

The driving-shaft 2 is fitted in boxes 3 at the rear end of the machine. The driving-pulley 4 is rigidly secured to the shaft 2. The usual loose pulley, being a well-known device, is not shown.

Inside of the rear portion of the frame are mounted and rigidly secured to the driving-shaft 2 two matcher-head-driving pulleys 5 and $5^a$. (See Figs. 1 and 2.)

Near the front end of the machine are rigidly secured two transverse frame-bars 6 and $6^a$, the bar 6 being round in cross-section and the bar $6^a$ square or rectangular in cross-section, as shown in Fig. 1; but any suitable form in cross-section may be used. On the bars 6 and $6^a$ are mounted two matcher-head frames 7 and $7^a$, (see Figs. 1 and 2,) each carrying in suitable boxes 8 a vertical matcher-head spindle 9 and pulleys $9^e$. From the frame 7 is a lug 10, extending out from one side of said frame.

Mounted transversely in the frame of the machine, so as to be capable of rotation, but prevented from moving longitudinally in its bearings, is a screw-bar 11. This screw-bar 11 passes through a corresponding screw-threaded hole in the lug 10 and is provided with a square head 12 on the outer side of the machine-frame, so that it can be turned by a handle fitted thereto or a wrench. Directly below the screw-bar 11 is another similar screw-bar 13, (shown in Fig. 1,) mounted transversely in the machine-frame in the same way and provided with a square head similar to the head 12, so that it can be turned with a handle or wrench. This screw-bar passes through a screw-threaded opening in the lug 14 on the cutter-head frame 7.

From the above description it will be seen that either cutter-head frame 7 or 7ᵃ may be moved toward or from the other by turning either of the screw-bars 11 or 13 in the manner above described.

Secured to the inside of the machine-frame is a transverse shaft 15. On the shaft 15 are mounted two belt-guiding frames 16, each carrying a tightening-pulley 17, mounted on a shaft 17ᵃ. The shaft 15 passes through slots or elongated openings 18, (see Fig. 1,) so as to allow a slight lateral oscillating movement and a vertical oscillating movement to the frames 16 on the shaft 15. The projection 15ᶜ, extending forward and resting against the shaft 15, acts as a pivotal point on which the frame 16 turns.

To keep the frames 16 in their proper position on the shaft 15, we secure collars 19 and 19ᵃ rigidly to the said shaft. (See Fig. 2.)

At the front of each frame is pivoted, by means of a bolt 20, a swinging frame-piece 21. (See Fig. 2.) At the front of each swinging frame 21 are two bars 22, securely bolted thereto, as shown in said Fig. 2, and extending forward, inclining toward each other until they meet and are welded or otherwise secured at their ends, which extend into an opening 23 (shown in Fig. 10) in the lower end of the bar 24, which is secured by bolts 25 (see Fig. 1) to the lower portions of each cutter-head frame 7 and 7ᵃ.

From the above construction it will be noticed that as the cutter-head frames are moved laterally back and forth the frames 16 and 21 are made to swing or oscillate in a horizontal direction on the shaft 15.

The means for swinging the ends of the frames 16 in a vertical direction up or down, and thus adjusting the tightening-pulleys against the belts 26, consists of a vertical screw-bar 27, one mounted in suitable bearings at each inner side of the machine-frame. (See Figs. 1 and 2.) At the top of each screw-bar 27 is a hand-wheel 28. The lower ends of said screw-bars pass through a hole 27ᵃ in a side extension 29 on one side of each frame 16, and each screw-bar 27 is provided with a screw-nut 30. (See Fig. 4, where a section is shown through one of the side extensions 29.) The under sides of these extensions taper down toward the opening 27ᵃ, through which the screw-bar 27 passes, so that the nut rests up against the contracted portion, and thereby allows the screw-bar to move back and forth laterally therein, substantially as shown by the dotted line $i$ in said Fig. 4.

The driving-pulley is tightened by means of a combined driving and tightening pulley 31. (See Figs 2 and 3.)

Rigidly secured to the side of the frame is a short shaft 32, (see Fig. 2, where the end of this shaft is shown,) on which is mounted a sleeve 32ᵃ, carrying two downwardly-extending arms 33 and 34, preferably made in one piece with it. Extending substantially horizontal or at right angles, or nearly so, from the sleeve portion (either directly from the arm 34, as shown in Fig. 2, or to one side of it, as shown in Figs 6 and 7) is another arm 35, having a tapered hole 36 through it. (See Fig. 9.) This hole 36 tapers only on two opposite sides, the other two sides being parallel, as shown in Fig. 7. The object of this construction is to allow the rod and nut which are connected with it to turn slightly to one side or the other, as will appear farther on.

Between the arms 33 and 34 are pivoted two arms 37 and 38, preferably cast in one piece with the supporting portion 39. (See Figs 2 and 5, where a plan view of these arms is shown.) The free ends of the arms 37 and 38 are provided with boxes 40, in which is mounted the tightening-pulley 31. At the forward end of the arm 38 is rigidly secured to it or cast in one piece with it a side portion 41, having an opening 42, similar to that shown in Fig. 4, through which a screw bar or rod 43 (shown in Fig. 3) passes and is secured by a nut which is located within a narrow space in the under side of the portion 41, (the same as the nut 30, shown in Fig. 4,) so it cannot turn therein, while the rod 43 is free to be turned in the nut, and thereby raise or lower the arms 37 and 38, as will appear farther on.

To the side of the machine is pivoted by a pin 45 a lever-arm 46, which moves within a curved rack-bar 46ᵃ, having teeth 46ᵉ. (See Figs. 2, 3, and 8.) It is provided at one end with a handle 47, by which it is operated, and at the opposite end with a circular head portion 48, having a series of grooves and ribs 49, which radiate from the center out to the periphery. Through a central hole in the head-piece 48 the screw-rod 43 passes and is provided with a hand-wheel 50, having a series of corresponding radial grooves and ribs adapted to fit in the grooves in the head-piece 48. Their object is to prevent the hand-wheel from turning when seated on the head-piece 48.

The lever-arm 46 is provided with a spring 51 (see Fig. 2) to hold it away from the side of the machine and in engagement with the teeth 46ᵉ when free to act.

Extending out from the side of the machine is a lug 53, having an opening through which is passed a screw-rod 54, having at its top end a hand-wheel 55, the top of the lug 53 having a series of radial grooves and ribs, into which a similar series on the under side of the hand-wheel fits when down thereon to prevent said wheel from turning. The lower end of the screw-rod 54 is screw-threaded and passes through a correspondingly-screw-threaded nut 56. (See Fig. 9.)

From the above-described construction it will now be seen that when it is desired to move the tightening-pulley 31 up or down it can be done by either operating the hand-wheel 50 or the lever 46, the lever 46 being used when a quick movement or relief is required. When it is desired to move the tightening-pulley 31 toward or from the driving-pulley 4, all that is required is to operate the hand-wheel 55, as will be understood from the foregoing description.

The object of the two bars 22 and frame 21 is to provide a vertically movable or swinging joint at or about the bar 20 and a lateral brace by means of the two bars, which incline together, as shown. A single bar rigidly secured to a cross-bar or frame 21 and hinged as described would answer the same purpose; but as it would be required to be made heavier to secure the same strength we prefer the construction described. The frame 21 and its pivotal bolt may also be dispensed with and the bars 22 rigidly secured to the frame 16. In this case the slots or openings 18 would have to be enlarged to allow for the vertical adjustment as well as for the horizontal or nearly horizontal lateral movement, substantially as indicated by the dotted lines S in Fig. 1; but the mechanism described is the preferred construction. The vertical adjustment of the frame 16 and its tightening-pulley could also be dispensed with and still the device would operate to guide the matcher-head belt in operative position while the matcher-head is being adjusted transversely.

We claim as our invention—

1. In a planing-machine, the combination with a matcher-head and matcher-head belt, of a tightening-pulley located on a substantially horizontal support and capable of a lateral swinging movement thereon, means connecting said tightening-pulley frame with the matcher-head frame and means for moving the matcher-head back and forth across the machine, whereby a movement of the matcher-head to one side or the other will adjust the tightening-pulley and driving-belt and keep it in operative position on the driving-pulley at any point to which said matcher-head may be adjusted.

2. In a planing-machine, the combination with a matcher-head and matcher-head belt, of a vertically-adjustable and laterally-movable frame carrying a tightening-pulley and mounted on a support on the machine, a screw-bar and means for operating it, for adjusting said frame and tightening-pulley vertically, means connecting said frame with the matcher-head frame, and means for moving the matcher-head across the machine and thereby operatively adjusting the tightening-pulley and driving-belt to any position the matcher-head may be moved.

3. In a planing-machine, the combination with a matcher-head and matcher-head belt, of a vertically-adjustable and laterally-movable supporting-frame, a tightening-pulley mounted in suitable bearings thereon, means for adjusting said frame and tightening-pulley vertically, a cross-bar for supporting said frame and upon which it is capable of a horizontal swinging movement, a longitudinal bar extending from a pivotal connection at the front end of the tightening-pulley frame so as to be capable of a swinging up or down movement, and having its opposite end in engagement with the matcher-head frame, and means for moving the matcher-head back and forth across the machine, thereby operating the tightening-pulley and keeping the matcher-head belt in operative position at any point to which the matcher-head may be adjusted.

4. In a planing-machine, the combination with the driving pulley and belt, of two downwardly-extending arms connected together by a cross-bar and mounted so as to swing on a short shaft extending from the side of the machine, an arm extending from one of said arms in a substantially horizontal direction, means for adjusting the end of said arm upward or downward and thereby moving the outer ends of the depending arms forward or back in a substantially horizontal direction, two arms connected together by a cross-bar and pivoted between the two depending arms, a tightening-pulley mounted thereon, and means for adjusting the said arms and tightening-pulley vertically, for the purpose described.

5. In a planing-machine, the combination with the machine-frame, the matcher-head adjustably mounted therein, the driving-pulley and the matcher-head belt, of an adjustable tightening-pulley and mechanism controlled by the matcher-head for adjusting the tightening-pulley to correspond to the adjustment of the matcher-head and thereby aline the pulley with the belt.

6. In a planing-machine, the combination with the machine-frame, the matcher-head adjustably mounted therein, the driving-pulley and the matcher-head belt, of a tightening-pulley and means for adjusting the tightening-pulley to correspond with the adjustment of the matcher-head.

7. In a planing-machine, the combination with the machine-frame, the matcher-head adjustably mounted therein, the driving-pulley and the matcher-head belt, of a tightening-pulley and means for adjusting the tightening-pulley simultaneously with the corresponding adjustment of the matcher-head.

8. In a planing-machine, the combination with the machine-frame, the matcher-head adjustably mounted therein, the driving-pulley and the matcher-head belt, of a tightening-pulley, means for adjusting the tightening-pulley to vary the tension of the belt and means for adjusting the tightening-pulley to correspond with the adjustment of the matcher-head.

9. In a planing-machine, the combination with the machine-frame, the matcher-head adjustably mounted therein, the driving-pulley and the matcher-head belt, of a tightening-pulley, adjusting mechanism for moving the tightening-pulley to correspond with the adjustment of the matcher-head and independent adjustment for adjusting the tightening-pulley to vary the tension of the belt.

10. In a planing-machine, the combination with the machine-frame, a substantially vertical shaft and a substantially horizontal shaft journaled in said frame, a matcher-head adjustably mounted on the substantially vertical shaft, a driving-pulley mounted on the substantially horizontal shaft, and a matcher-head belt, of a tightening-pulley and means for adjusting the tightening-pulley to correspond with the adjustment of the matcher-head.

11. In a planing-machine, the combination with a matcher-head and matcher-head belt, of a tightening-pulley mounted on a support and capable of a lateral swinging movement thereon, an operative connection between said tightening-pulley frame and the matcher-head frame and means for moving the matcher-head back and forth across the machine.

EDWARD HOLMES.
BRITAIN HOLMES.
EDWIN F. BEUGLER.

Witnesses:
L. M. BILLINGS,
G. A. NEUBAUER.